United States Patent
Choo et al.

(10) Patent No.: US 9,547,347 B2
(45) Date of Patent: Jan. 17, 2017

(54) CIRCUIT DEVICE FOR POWER COMPENSATION IN INTEGRATED CONTROLLER

(71) Applicants: Hyundai Motor Company, Seoul (KR); Yura Corporation Co., Ltd., Cheongwon, Chungcheongbuk-Do (KR)

(72) Inventors: Sung Kwan Choo, Gyeonggi-do (KR); Joon Ho Lee, Gyeonggi-do (KR); Jung Nan Ryu, Seoul (KR); Heon Ho Lim, Gyeonggi-do (KR); Sung Il Lee, Gyeonggi-do (KR)

(73) Assignee: Yura Corporation Co., Ltd., Seongnam, Gyeonggi-Do (KR)

( * ) Notice: Subject to any disclaimer, the term of this patent is extended or adjusted under 35 U.S.C. 154(b) by 691 days.

(21) Appl. No.: 13/920,396

(22) Filed: Jun. 18, 2013

(65) Prior Publication Data

US 2014/0175879 A1 Jun. 26, 2014

(30) Foreign Application Priority Data

Dec. 24, 2012 (KR) ........................ 10-2012-0151911

(51) Int. Cl.
*H02J 9/00* (2006.01)
*G06F 1/26* (2006.01)
(Continued)

(52) U.S. Cl.
CPC . *G06F 1/26* (2013.01); *H02J 1/08* (2013.01); *H04L 12/6418* (2013.01); *H02J 9/06* (2013.01); *Y10T 307/391* (2015.04)

(58) Field of Classification Search
CPC ................... H02J 9/00; H02J 1/08; G06F 1/26
(Continued)

(56) References Cited

U.S. PATENT DOCUMENTS 5,987,365 A * 11/1999 Okamoto .............. F02D 41/266
701/34.3
7,235,898 B1 * 6/2007 Jones, III ............ B60R 16/0315
307/29
(Continued)

FOREIGN PATENT DOCUMENTS

JP 06318160 11/1994
JP 10-297395 11/1998
(Continued)

*Primary Examiner* — Rexford Barnie
*Assistant Examiner* — Daniel Kessie
(74) *Attorney, Agent, or Firm* — Mintz Levin Cohn Ferris Glovsky and Popeo, P.C.; Peter F. Corless

(57) ABSTRACT

A circuit device for power compensation in an integrated controller configured by integrating two or more different electronic control modules, which enable any one of the electronic control modules to receive power supplied from another electronic control module even though an abnormal operation occurs in the electronic control module. That is, the circuit device provides for power compensation in an integrated controller configured by integrating two or more different electronic control modules respectively having independent power circuits, which enable any one of the electronic control modules to immediately receive power supplied from another electronic control module even though an abnormal operation occurs in the electronic control module, thereby easily preventing the abnormal operation of the integrated controller.

3 Claims, 4 Drawing Sheets

(51) Int. Cl.
   *H04L 12/64*   (2006.01)
   *H02J 1/08*   (2006.01)
   *H02J 9/06*   (2006.01)
(58) Field of Classification Search
   USPC .......................................................... 307/29
   See application file for complete search history.

(56) References Cited

U.S. PATENT DOCUMENTS

| | | | |
|---|---|---|---|
| 2006/0247835 A1* | 11/2006 | Nagata | F02D 41/266 |
| | | | 701/36 |
| 2010/0066172 A1* | 3/2010 | Lv | G05D 23/19 |
| | | | 307/64 |
| 2010/0141209 A1* | 6/2010 | Shiu | H02J 7/0016 |
| | | | 320/120 |

FOREIGN PATENT DOCUMENTS

| | | |
|---|---|---|
| JP | 2002354707 A | 12/2002 |
| JP | 2012038040 A | 2/2012 |
| KR | 10-2002-0027047 | 4/2002 |
| KR | 10-0321976 | 5/2002 |

* cited by examiner

CIRCUIT DEVICE FOR POWER COMPENSATION IN INTEGRATED CONTROLLER

CROSS-REFERENCE TO RELATED APPLICATION

This application claims under 35 U.S.C. §119(a) the benefit of Korean Patent Application No. 10-2012-0151911 filed Dec. 24, 2012, the entire contents of which are incorporated herein by reference.

BACKGROUND (a) Technical Field

The present disclosure relates to a circuit device for power compensation in an integrated controller. More particularly, the present disclosure relates to a circuit device for power compensation in an integrated controller configured by integrating two or more different electronic control modules, which enable any one of the electronic control modules to receive power supplied from another electronic control module even though an abnormal operation occurs in the electronic control module.

(b) Background Art

Recently, an attempt to integrate a vehicle gateway and a smart junction box (SJB) has been made. The gateway refers to a control unit that enables data (various kinds of driving information) communication between electronic control units (ECUs) having different communication schemes such as a controller area network (CAN) and a local interconnect network (LIN). The SJB refers to a control unit that basically includes not only a fuse for power supplied to various types of electric circuits and various types of relay circuits but also an embedded micro computer unit (MCU) capable of controlling operating times of some electronic components. Although the gateway and the SJB are integrated, power circuits and control circuits, independent to each other, are provided to the gateway and the SJB, respectively.

As shown in FIG. 1, in an integrated controller 100 configured by integrating a gateway and an SJB, a power circuit 202, an MCU 204 and a control circuit 206 are independently provided in a SJB control module 200, and a power circuit 302, an MCU 304 and a control circuit 306 are independently provided in a gateway control module 300. However, as a power circuit is independently provided in each MCU in an SJB-gateway integrated unit of a vehicle, a corresponding system does not operate when the power circuit is abnormally operated, and is not restored to the original state. That is, when the power circuit 202 of the SJB control module 200 becomes an operation impossible state, the MCU 204 and the control circuit 206 of the SJB control module 200 are not driven. On the contrary, when the power circuit 302 of the gateway control module 300 becomes an operation impossible state, the MCU 304 and the control circuit 306 of the gateway control module 300 are not driven. As a result, this acts as a potential risk factor in the entire electronic system of the vehicle.

SUMMARY OF THE DISCLOSURE

The present disclosure provides a circuit device for power compensation in an integrated controller configured by integrating two or more different electronic control modules respectively having independent power circuits, which enable any one of the electronic control modules to immediately receive power supplied from another electronic control module even though an abnormal operation occurs in the electronic control module, thereby easily preventing the abnormal operation of the integrated controller.

In one aspect, the present disclosure provides a circuit device for power compensation in an integrated controller configured by integrating two or more different electronic control modules including first and second electronic control modules, wherein a power compensation circuit including a power switching unit and a power circuit fail-state decision unit is connected between the two or more electronic control modules, so that although a power circuit of any one of the electronic control modules is abnormally operated, the electronic control module receives power supplied from a power circuit of another electronic control module.

In an exemplary embodiment, the first electronic control module may be employed as a smart junction box (SJB) control module in which a power circuit, a micro computer unit (MCU) and a control circuit are sequentially connected, and the second electronic control module may be employed as a gateway control module in which a power circuit, an MCU and a control circuit are sequentially connected.

The power compensation circuit may include a first power compensation circuit for power compensation of the SJB control module, and a second power compensation circuit for power compensation of the gateway control module. The first power compensation circuit may include a first power switching unit connected between an output terminal of the power circuit of the gateway control module and a power input terminal of the MCU of the SJB control module; and a first power circuit fail-state decision unit connected to enable input and output terminals of the power circuit of the SJB control module so as to control switching on/off of the first power switching unit.

The second power compensation circuit may include a second power switching unit connected between an output terminal of the power circuit of the SJB control module and a power input terminal of the MCU of the gateway control module; and a second power circuit fail-state decision unit connected to enable input and output terminals of the power circuit of the gateway control module so as to control switching on/off of the second power switching unit. Each of the first power switching unit of the first power compensation circuit and the second power switching unit of the second power compensation circuit may be employed as any one selected from switching elements including a transistor, a field effect transistor (FET) and a relay.

Advantageously, in the integrated controller configured by integrating two or more independent electronic control modules, power compensation circuits of the electronic control modules are connected to each other, so that although an error occurs in any one of the electronic control modules, the power circuit of another electronic control module is connected to the power circuit of the electronic control module in which the error occurs, thereby preventing the abnormal operation of each electronic control module in the integrated controller.

In the existing system, a separate MCU for backup is added to implement a fail-safe function. However, in the present disclosure, the fail-safe function is performed in the MCUs performing different functions, so that the separate MCU for backup can be removed, thereby reducing unit cost.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
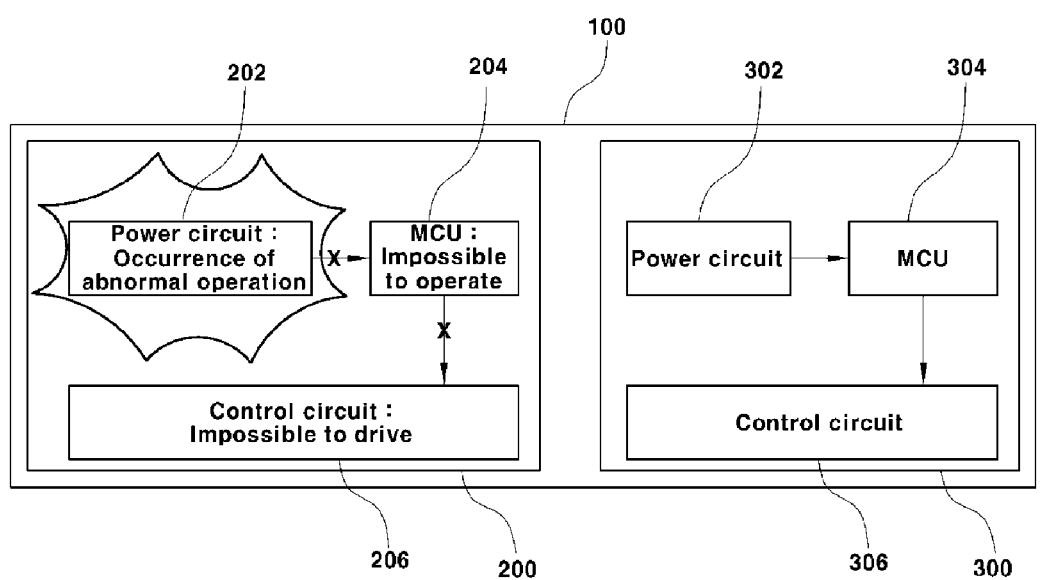
FIG. 1 is a schematic view illustrating a conventional integrated controller in which two or more different electronic control modules are integrated.

Reference numbers refer to the same or equivalent parts of the present disclosure throughout the figures. It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

It is understood that the term "vehicle" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

Hereinafter reference will now be made in detail to embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the invention as defined by the appended claims.

In the present disclosure, a first electronic control module and a second electronic module are integrated in an integrated controller, and switching is performed so that when the power supply of a component in any one of the first and second electronic modules is abnormally operated, the power of a component normally operated in the other of the first and second electronic modules is supplied to the abnormally operated component. Accordingly, a smart junction box (SJB) and a gateway are not abnormally operated even in an abnormal condition. Hereinafter, for better understanding of the present disclosure, the first electronic control module is referred to as an SJB control module, and the second electronic control module is referred to as a gateway control module.

Figure 2:
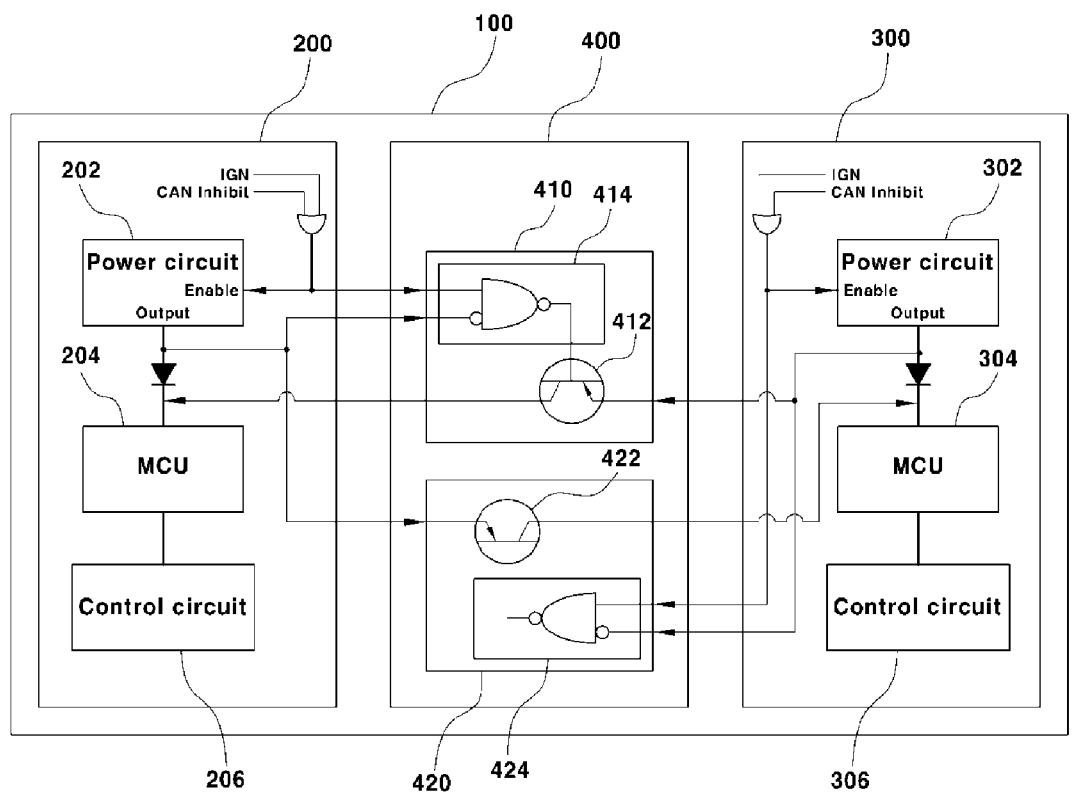
FIGS. 2 and 3 are circuit diagrams illustrating an integrated controller provided with a circuit device for power compensation according to embodiments of the present disclosure.

FIG. 2 illustrates an integrated controller provided with a circuit device for power compensation according to embodiments of the present disclosure. As shown in FIG. 2, in the integrated controller 100, a power circuit 202, a micro computer unit (MCU) 204 and a control circuit 206 are independently provided in an SJB control module 200, and a power circuit 302, an MCU 304 and a control circuit 306 are independently provided in a gateway control module 300.

The integrated controller 100 is provided with a power compensation circuit 400 for power compensation when the power circuit 202 of the SJB control module 200 or the power circuit 302 of the gateway control module 300 in the integrated controller 100 is abnormally operated. The power compensation circuit 400 may be configured with two or more power compensation circuits including a first power compensation circuit 410 for the SJB control module 200, a second power compensation circuit 420 for the gateway control module 300, and the like.

In this case, for illustrative purposes, the first and second power compensation circuits 410 and 420 have the same configuration, except that objects for power compensation are the SJB control module and the gateway control module, respectively. However, the present disclosure is not limited to the above arrangement, whereby the first and second power compensation circuits 410 and 420 need not necessarily have the same configuration.

The first power compensation circuit 410 is a circuit for power compensation of the SJB control module 200. The first power compensation circuit 410 includes a first power switching unit 412 connected between a power output terminal of the power circuit 302 of the gateway control module 300 and an input terminal of the MCU 204 of the SJB control module 200, and a first power circuit fail-state decision unit 414 connected to enable input and output terminals of the power circuit 202 of the SJB control module 200 so as to control switching on/off of the first power switching unit 412.

Similarly, the second power compensation circuit 420 is a circuit for power compensation of the gateway control module 300. The second power compensation circuit 420 includes a second power switching unit 422 connected between an output terminal of the power circuit 202 of the SJB control module 200 and a power input terminal of the MCU 304 of the gateway control module 300, and a second power circuit fail-state decision unit 424 connected to enable input and output terminals of the power circuit 302 of the gateway control module 300 so as to control switching on/off of the second power switching unit 422.

Meanwhile, the first or second power circuit fail-state decision unit 414 or 424 may implement its function through a separate transistor and an element such as a logic IC. Moreover, the first or second power switching unit 412 or 422 may implement its function using a switching element such as a transistor, field effect transistor (FET) or relay.

Figure 3:
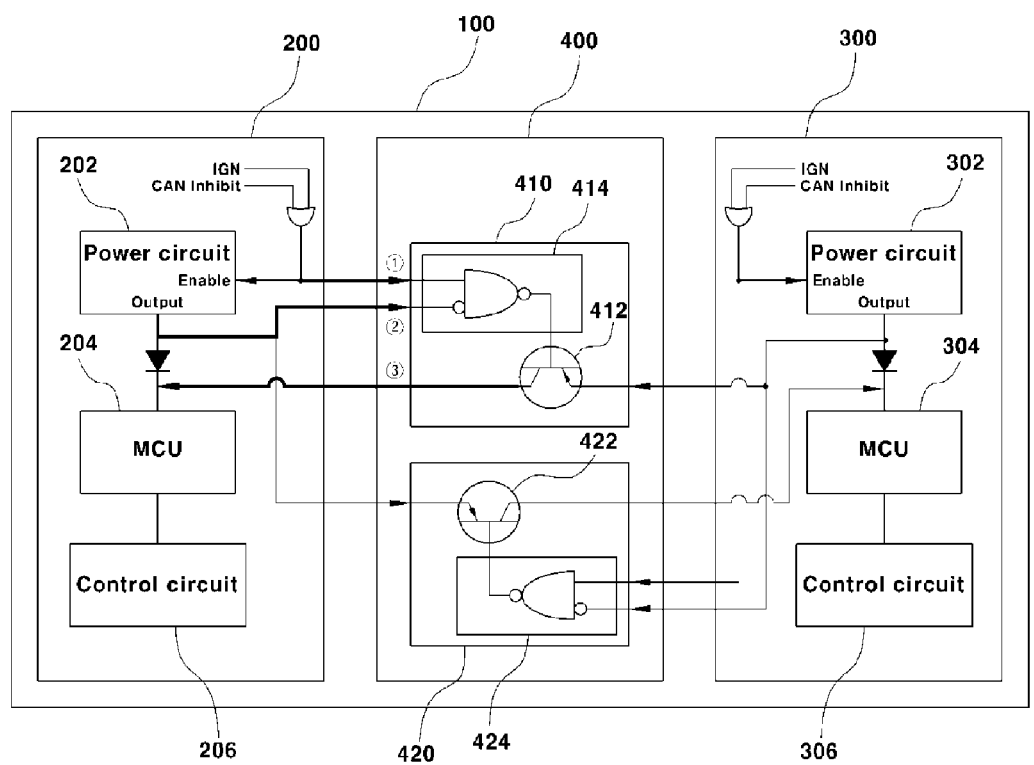
Figure 4:
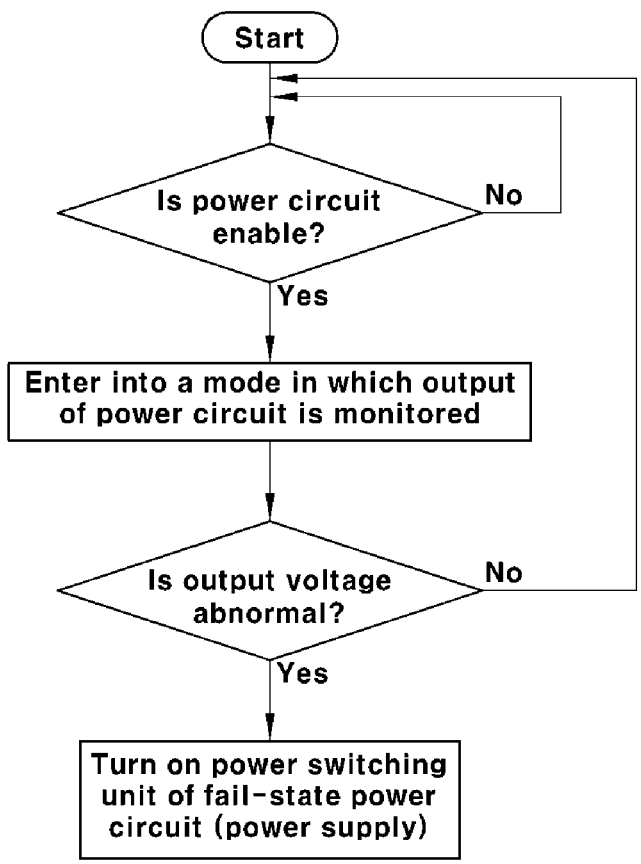
FIG. 4 is a flowchart illustrating a power compensation process of the circuit device according to embodiments of the present disclosure.

Hereinafter, a power compensation process based on the circuit device according to embodiments of the present disclosure will be described with reference to FIGS. 3 and 4. FIG. 3 is a circuit diagram illustrating an operation of the first power compensation circuit for power compensation of the SJB control module. FIG. 4 is a flowchart illustrating the power compensation process corresponding to the operation of the first power compensation circuit for power compensation of the SJB control module, as depicted in FIG. 3. Here, for illustrative purposes, the first and second power compensation circuits 410 and 420 perform the same power compensation operation, except that objects for power compensation are the SJB control module and the gateway control module, respectively. Therefore, a case where power compensation is performed on the power circuit of the SJB control module will be described as an embodiment.

The following Table 1 illustrates a logic table for power compensation of the SJB control module.

TABLE 1

| | Power circuit fail-state decision unit | | | Power switching unit | |
|---|---|---|---|---|---|
| | Enabling the input of power circuit | Monitoring the output of power circuit | Decision result | Enabling the input of power switching unit | Monitoring the output of power switching unit |
| 1 | On | Output of power circuit | Normal | off | off |
| 2 | On | Abnormal voltage | Fail state of power circuit | on | on |
| 3 | Off | None | Normal | off | off |

When the enable input terminal of the power circuit 202 of the SJB control module 200 becomes an "ON" state, a voltage is normally output from the output terminal of the power circuit 202. Then, the output voltage is input to the MCU 204 so that the MCU 204 and the control circuit 206 are normally operated. However, when the voltage from the output terminal of the power circuit 202 is abnormal due to a problem occurring in the power circuit 202 even though the enable input terminal of the power circuit 202 of the SJB control module 200 becomes the "ON" state, the MCU 204 is not operated. Such a state refers to a fail state of the power circuit 202. Thus, when the first power circuit fail-state decision unit 414 of the first power compensation circuit 410 decides that the enable input terminal of the power circuit 202 becomes the "ON" state and simultaneously, the voltage output from the output terminal of the power circuit 202 is within a normal level range, the first power switching unit 412 is maintained as an "OFF" state, so that a normal output voltage is input to the MCU 204 from the power circuit 202 of the SJB control module 200.

On the other hand, when the first power circuit fail-state decision unit 414 of the first power compensation circuit 410 decides that the enable input terminal of the power circuit 202 becomes the "ON" state (see the arrow indicated by ① of FIG. 3) and simultaneously, the voltage output from the output terminal of the power circuit 202 is out of the normal level range (see the arrow indicated by ② of FIG. 3), the first power circuit fail-state decision unit 414 controls the first power switching unit 412 to be turned on, so that the output terminal of the power circuit 302 of the gateway control module 300 and the input terminal of the MCU 204 of the SJB control module 200 are electrically connected to each other (see the arrow indicated by ③ of FIG. 3). Accordingly, the normal output voltage is applied to the MCU 204 of the SJB control module 200 from the power circuit 302 of the gateway control module 300.

As described above, although an abnormal operation occurs in the power circuit 202 of the SJB control module 200, the normal output voltage is applied to the MCU 204 and the control circuit 206 of the SJB control module 200 from the power circuit 302 of the gateway control module 300, so that it is possible to easily prevent the SJB control module 200 and the gateway control module 300 from being abnormally operated in an abnormal condition. Although the SJB control module 200 and the gateway control module 300 are normally operated, an error may have occurred in the power circuit 202 of the SJB control module 200. Therefore, the error of the power circuit 202 is notified to a driver, using a method of turning on a warning lamp through a cluster lamp in front of the driver. Meanwhile, when the enable input terminal of the power circuit 202 is detected to be in the "OFF" state, the "OFF" state is considered as a state such as start-off, and therefore, the first power circuit fail-state decision unit 414 does not decide whether the power circuit 202 fails.

As described above, in the integrated controller configured by integrating two or more independent electronic control modules, power compensation circuits of the electronic control modules are connected to each other, so that although an abnormal operation caused by electromagnetic waves or an abnormal operation caused by a failure of the power circuit occurs in any one of the electronic control modules, the power supply state is continuously maintained, thereby easily protecting the integrated controller from the abnormal operation.

Alternatively, the first and second power circuit fail-state decision unit 414 and 424 may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Additionally, it is understood that the below methods are executed by at least one control unit. The term "control unit" refers to a hardware device that includes a memory and a processor. The memory is configured to store the program instructions and the processor is specifically configured to execute said program instructions to perform one or more processes which are described further below.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A circuit device for power compensation in an integrated controller, comprising: two or more different integrated electronic control modules including first electronic control module and second electronic control module; and
   a power compensation circuit including a power switching unit and a power circuit fail-state decision control unit connected between the two or more electronic control modules,
   wherein when the power circuit fail-state decision control unit determines a power circuit of any one of the electronic control modules is abnormally operated, the electronic control module including the abnormally operating power circuit receives power supplied from a normally operating power circuit of another electronic control module,
   the first electronic control module is employed as a smart junction box (SJB) control module in which a power circuit, a micro-computer unit (MCU) and a control circuit are sequentially connected,
   the second electronic control module is employed as a gateway control module in which a power circuit, an MCU and a control circuit are sequentially connected,
   the power compensation circuit includes:
   a first power compensation circuit for power compensation of the SJB control module, and
   a second power compensation circuit for power compensation of the gateway control module, the first power compensation circuit includes:
   a first power switching unit connected between an output terminal of the power circuit of the gateway control module and an input terminal of the MCU of the SJB control module, and
   a first power circuit fail-state decision unit connected to enable input and output terminals of the power circuit of the SJB control module so as to control switching on/off of the first power switching unit, and
   the first power circuit fail-state decision unit controls the first power switching unit to be turned on when voltage output from the output terminal of the power circuit is out of a normal level range
   wherein the second power compensation circuit includes:
   a second power switching unit connected between an input terminal of the power circuit of the SJB control module and an input terminal of the MCU of the gateway control module; and
   a second power circuit fail-state decision unit connected to enable input and output terminals of the power circuit of the gateway control module so as to control switching on/off of the second power switching unit
   wherein each of the first power switching unit of the first power compensation circuit and the second power switching unit of the second power compensation circuit is employed as any one of a transistor, a field effect transistor (FET) or a relay.

2. A method for power compensation in the circuit device for power compensation in an integrated controller of claim 1, comprising:
   determining whether a power circuit of any one of the two or more electronic control modules are enabled;
   when the power circuit of any one of the two or more electronic control modules are enabled, monitoring an output voltage of the power circuit;
   determining whether the output voltage of the power circuit is abnormal; and when the output voltage of the power circuit is abnormal, activating the power switching unit to receive at an electronic control module in which the power circuit is connected power supplied from another power circuit of another electronic control module.

3. The method of claim 2, wherein the power circuit controls the power switching unit to be turned on when voltage output from an output terminal of the power circuit is out of a normal level range.

* * * * *